(12) United States Patent
Duffen et al.

(10) Patent No.: US 11,566,529 B2
(45) Date of Patent: Jan. 31, 2023

(54) TURBINE COMPONENT WITH BOUNDED WEAR COAT

(71) Applicant: General Electric Company, Schenectady, NY (US)

(72) Inventors: Shawn Patrick Duffen, Windham, NH (US); Donald Brett DeSander, Arlington, MA (US); Victor Hugo Silva Correia, Milton Mills, NH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 327 days.

(21) Appl. No.: 15/683,332

(22) Filed: Aug. 22, 2017

(65) Prior Publication Data
US 2019/0063232 A1    Feb. 28, 2019

(51) Int. Cl.
*F01D 5/22* (2006.01)
*F01D 5/28* (2006.01)

(52) U.S. Cl.
CPC ............. *F01D 5/225* (2013.01); *F01D 5/286* (2013.01); *F01D 5/288* (2013.01); *F05D 2220/32* (2013.01); *F05D 2230/90* (2013.01); *F05D 2240/307* (2013.01); *F05D 2250/131* (2013.01); *F05D 2250/141* (2013.01); *F05D 2300/175* (2013.01); *F05D 2300/20* (2013.01); *F05D 2300/506* (2013.01); *F05D 2300/611* (2013.01)

(58) Field of Classification Search
CPC .......... F01D 5/225; F01D 5/286; F01D 5/288; F05D 2220/32; F05D 2230/90; F05D 2240/307; F05D 2250/131; F05D 2250/141; F05D 2300/175; F05D 2300/20; F05D 2300/506; F05D 2300/611
See application file for complete search history.

(56) References Cited

U.S. PATENT DOCUMENTS

| | | | |
|---|---|---|---|
| 4,873,038 A | 10/1989 | Rapp et al. | |
| 5,956,845 A | 9/1999 | Arnold | |
| 6,049,978 A | 4/2000 | Arnold | |
| 6,419,753 B1 | 7/2002 | Wheat et al. | |
| 6,582,194 B1 | 6/2003 | Birkner et al. | |
| 6,605,161 B2 | 8/2003 | Fairbourn | |
| 7,625,180 B1* | 12/2009 | Liang | F01D 5/186 29/889.2 |
| 8,122,600 B2 | 2/2012 | Kinstler et al. | |
| 8,367,964 B2 | 2/2013 | Sullivan et al. | |
| 2015/0132605 A1* | 5/2015 | Kumar | C04B 35/117 428/680 |
| 2018/0010469 A1* | 1/2018 | Kadau | F01D 11/08 |
| 2019/0032498 A1* | 1/2019 | Xu | F04D 29/324 |

* cited by examiner

Primary Examiner — Grant Moubry
Assistant Examiner — Ruben Picon-Feliciano
(74) Attorney, Agent, or Firm — Venable LLP; Elizabeth C. G. Gitlin; Michele V. Frank

(57) ABSTRACT

A turbomachinery component with a surface that includes a bounded wear coat, the component includes: a body; a contact surface defined by the body; a recess extending into the body and communicating with the contact surface; and a wear coat positioned in the recess.

14 Claims, 4 Drawing Sheets

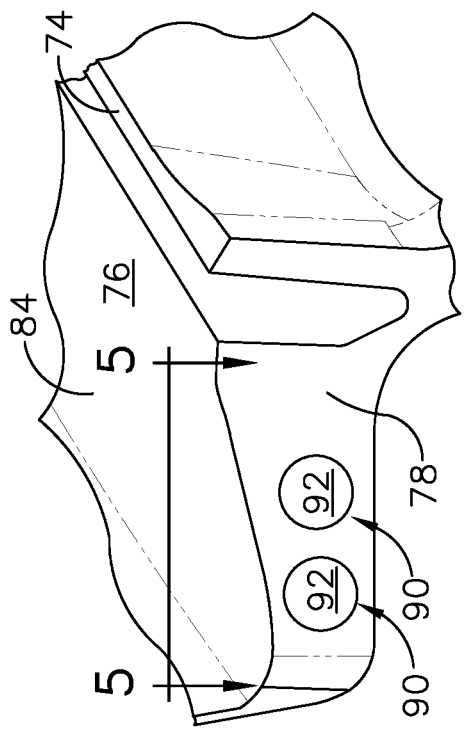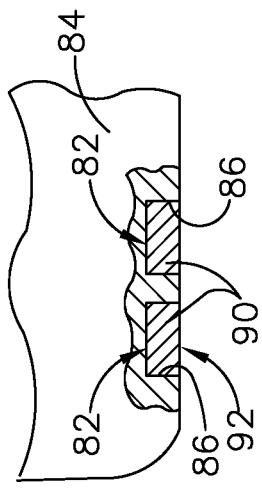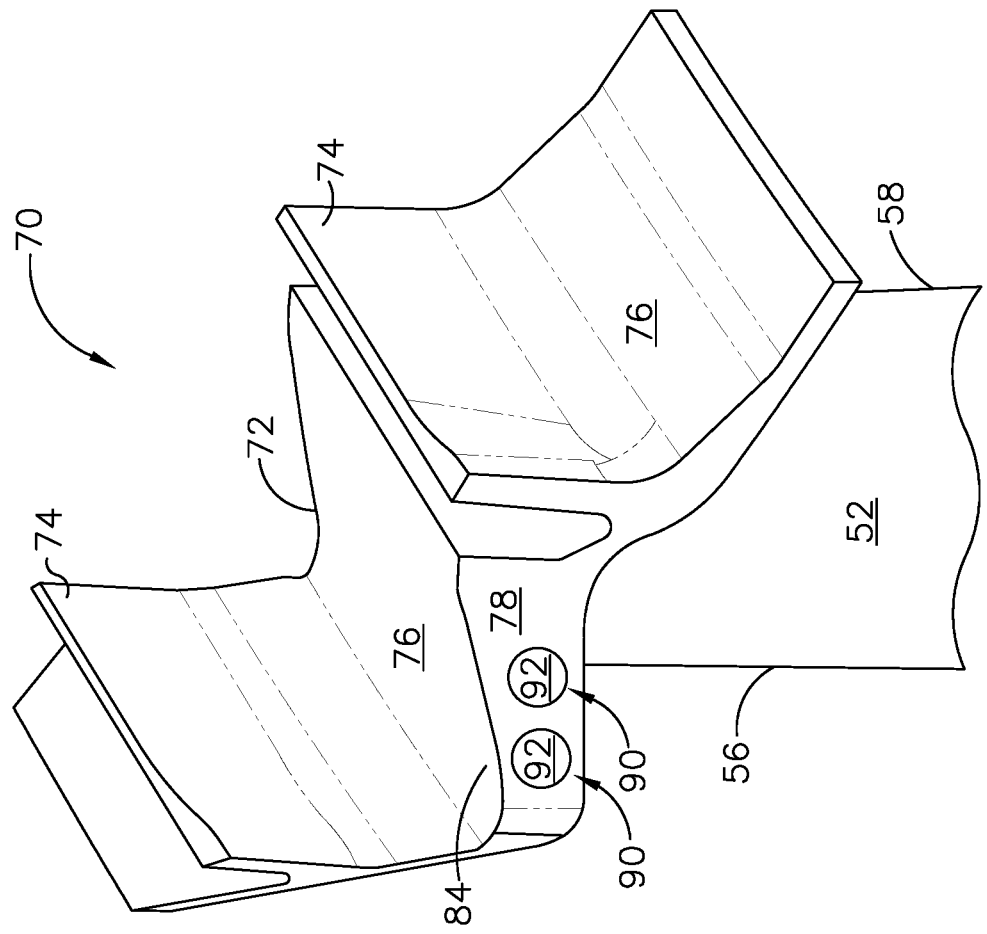

TURBINE COMPONENT WITH BOUNDED WEAR COAT

STATEMENT REGARDING FEDERALLY SPONSORED RESEARCH & DEVELOPMENT

The U.S. Government may have certain rights in this invention pursuant to contract number W58RGZ-16-C-0047 awarded by the Department of the Army.

BACKGROUND OF THE INVENTION

This invention relates generally to gas turbine engines, and more particularly relates to internal components of such engines.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work. One common type of turbine includes a rotating disk with a row of airfoils, referred to as turbine blades.

In some turbines, the blades are long and thin and are bounded on their outer ends by tip shrouds. Tip shrouds of adjacent blades are positioned to contact each other such that in normal operation little or no relative motion occurs between blades. However, under certain conditions some relative motion does occur and this motion can cause fretting wear. Therefore, the affected surfaces need to be protected from wear. Conventionally, the affected surfaces are protected with the material referred to as a "wear coat" which is a metal alloy or other material having a high hardness. The blades are built with a preload to ensure that the adjacent tip shroud end surfaces touch and bear against each other. One problem with such an arrangement is that the wear coat is subject to high-temperature "creep" which is time-dependent plastic strain. Stated another way, the wear coat material can deflect or smear out of its intended location.

BRIEF DESCRIPTION OF THE INVENTION

This problem is addressed by providing a tip shroud structure where the end walls are configured to such that the wear coat is bounded such that the wear coat is contained and creep is reduced or eliminated relative to conventional wear coat applications.

According to one aspect of the technology described herein, a turbomachinery component is provided with a surface that includes a bounded wear coat. The component includes: a body; a contact surface defined by the body; a recess extending into the body and communicating with the contact surface; and a wear coat positioned in the recess.

According to another aspect of the technology described herein, an apparatus that includes a bounded wear coat, includes: a first body comprised of a first material that defines at least a portion of a first abutting component; a first recess defined by the first body; a first wear coat comprised of a second material positioned within the first recess; a second body comprised of the first material that defines at least a portion of a second abutting component; a second recess defined by the second body; a second wear coat comprised of the second material positioned within the second recess; and wherein the first wear coat defines a first fretting surface that contacts a second fretting surface defined by the second wear coat.

According to another aspect of the technology described herein, there is provided a method of making a component that includes a bounded wear coat. The method includes the steps of: providing a component body that defines a contact surface and that includes a recess defined within the component body such that the recess is connected to the contact surface; and positioning a wear coat material within the recess such that the wear coat material defines a hard surface that is generally contiguous with the contact surface.

BRIEF DESCRIPTION OF THE DRAWINGS

The invention may be best understood by reference to the following description taken in conjunction with the accompanying drawing figures in which:

FIG. 3 is a perspective view of an end portion of the blade shown in FIG. 2 that includes a bounded wear coat;

FIG. 4 shows a portion of the tip shroud of the blade shown in FIG. 3;

FIG. 5 shows a section of the tip shrouds shown in FIG. 4 taken along line 5-5;

DETAILED DESCRIPTION OF THE INVENTION

Figure 1:
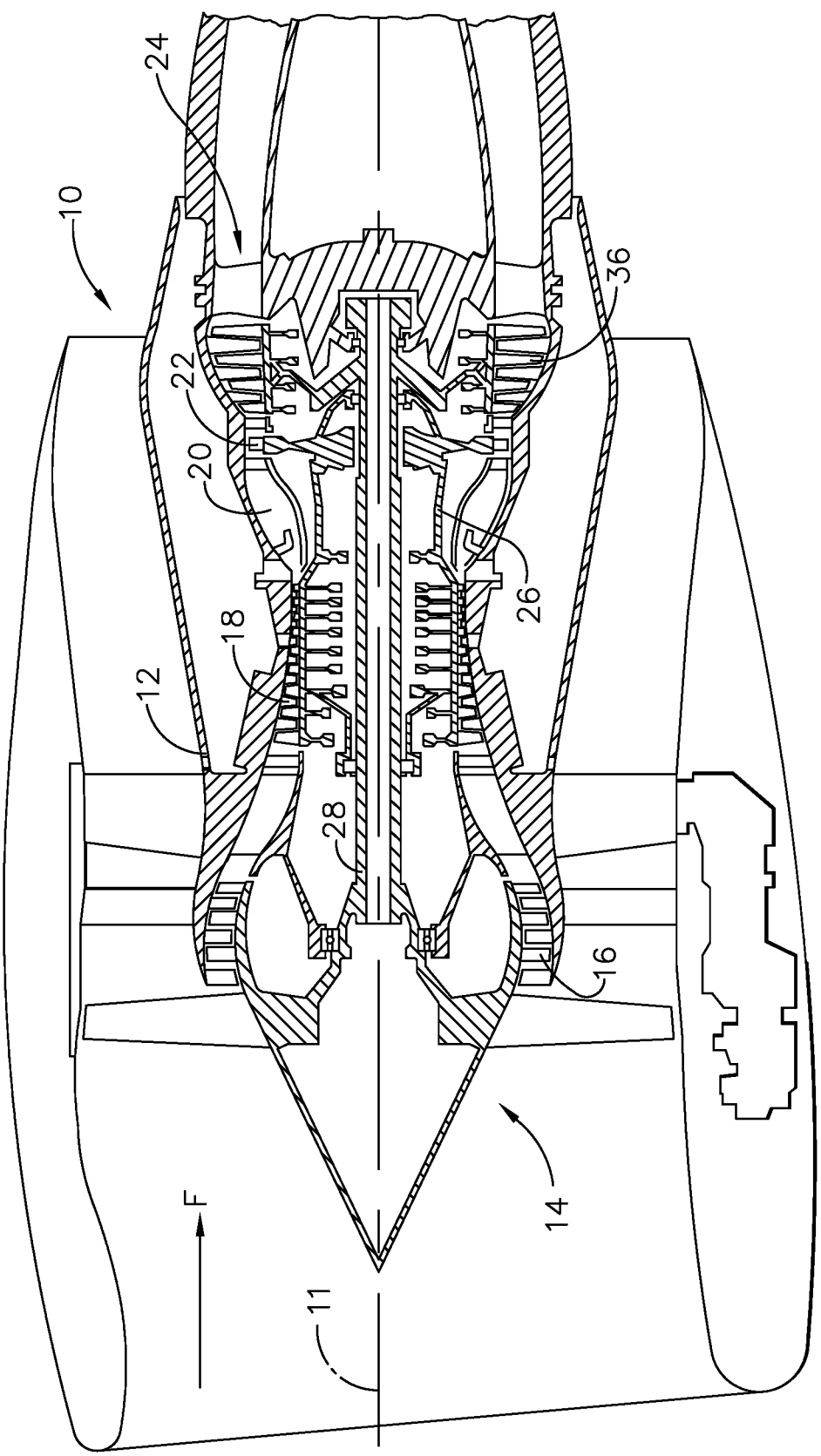
FIG. 1 is a cross-sectional, schematic view of a gas turbine engine that incorporates a turbine with blades that have contacting tip shrouds that are in part defined by a wear coat.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc. Further, the present invention applies to other types of machinery that include contacting surfaces that might be subject to wear.

The engine 10 has a longitudinal center line or axis 11 and a stationary core casing 12 disposed concentrically about and coaxially along the axis 11. It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, booster 16, compressor 18, combustor 20, high pressure turbine or "HPT" 22, and low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 14 and booster 16 via an inner shaft 28.

The LPT 24 includes a turbine rotor 36. While the concepts of the present invention will be described using the LPT 24 as an example, it will be understood that those concepts are applicable to any of the turbines, or to any other turbomachinery components, or to other machinery elements in contact with each other.

Figure 2:
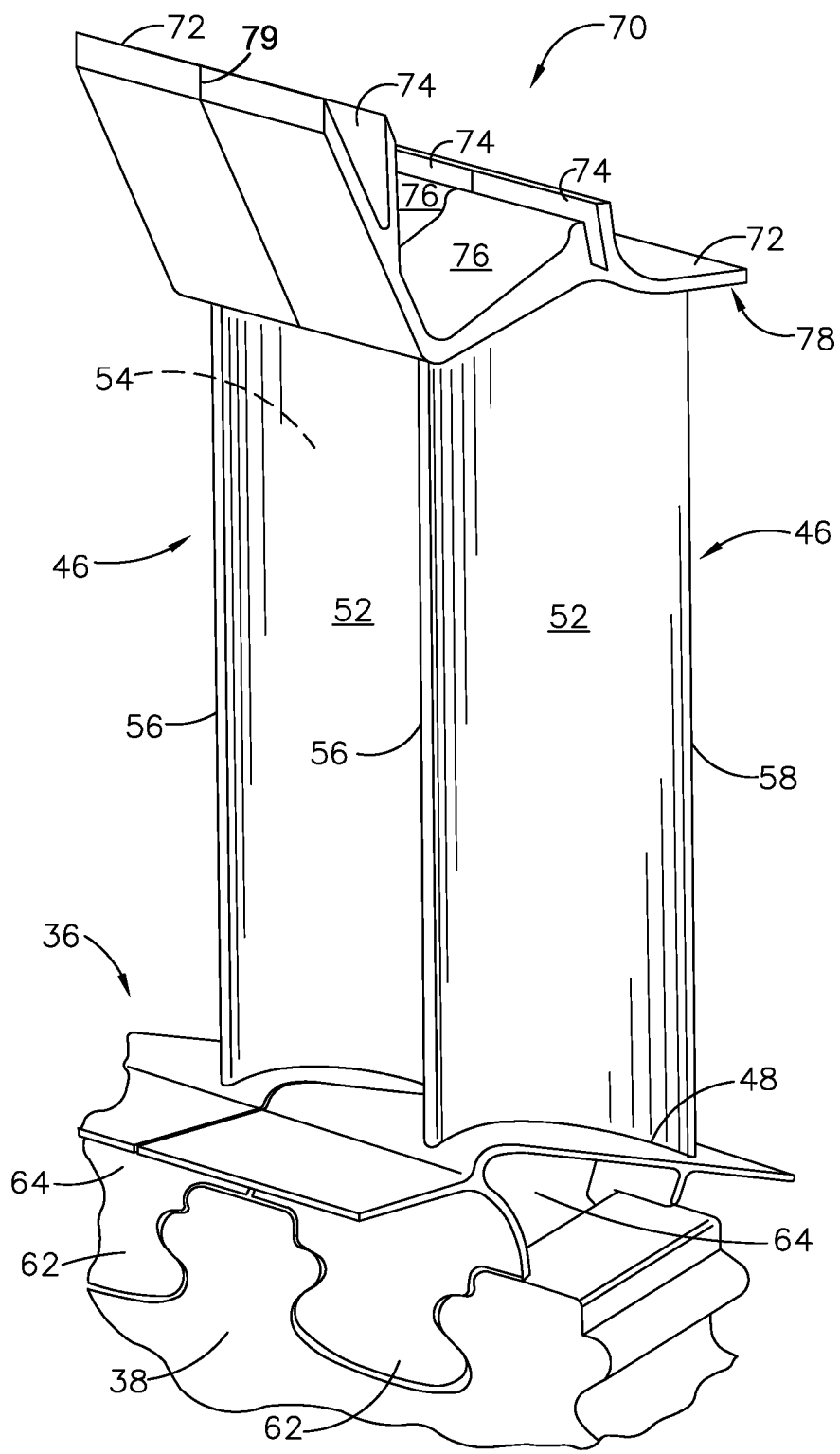
FIG. 2 is a front elevation view of a portion of a turbine rotor suitable for inclusion in the engine of FIG. 1.

Referring now to FIG. 2, the rotor 36 includes a disk 38, and an array of turbine blades 46 extend from the disk 38. In FIG. 2, two of the turbine blades 46 are shown. The two turbine blades 46 can be considered a first component and a second component, specifically turbomachinery components, that are adjacent to each other. The turbine blades 46 constitute "turbomachinery airfoils" for the purposes of this invention. Each turbine blade 46 extends from a root 48 to a tip 70, and includes a concave pressure side 52 joined to a convex suction side 54 at a leading edge 56 and a trailing edge 58.

The root 48 of each blade 46 includes a dovetail 62 and a shank 64. The tip 70 of each blade 46 includes a tip shroud 72. The tip shroud 72 includes seal teeth 74 that are configured for the purpose of engaging an abradable seal, for example, a honeycomb seal (not shown). The tip shroud 72 also defines a tip shroud outer surface 76 and at least one end surface 78, also referred to herein as a "contact surface". The end surface 78 is configured to contact an adjacent end surface 78 of an adjacent tip shroud 72. The end surfaces 78 of adjacent tip shrouds 72 define a split line 79.

Referring now to FIGS. 3, 4, and 5, the tip shroud 72 of each blade 46 includes a tip shroud body 84 which defines at least one end surface 78. The end surface 78 includes at least one recess 82. The recess 82 is bounded by a wall surface 86 that intersects with the end surface 78 such that the recess 82 can be open to the end surface 78. The wall surface 86 is dimensioned to receive and bound a wear coat 90 such that it does not smear or creep, and is defined by the material of the tip shroud body 84 which can be referred to as parent material.

The wear coat 90 is configured to provide protection from fretting and wear. The wear coat 90 defines a hardened fretting surface 92. As shown in FIG. 3, the face shape of the wear coat 90 is generally circular and wear coat elements are positioned at multiple discrete locations in the end surface 78. It should be appreciated that the wear coat 90 can be geometric shapes other than that shown in the illustrated embodiment. It should also be appreciated that the wear coat 90 can be distributed across the end surface 78 ways other than that shown in the illustrated embodiment The disk 38 and turbine blades 46 may be constructed from any material capable of withstanding the anticipated stresses and environmental conditions in operation. Non-limiting examples of known suitable alloys include nickel- and cobalt-based alloys.

The recess 82 can be formed in the tip shroud body 84 by various manufacturing methods. By way of example and not limitation, such methods include the following: additive manufacturing, conventional machining, molding, conventional parts assembly, casting, and a combination thereof.

The material of the wear coat 90 is selected to be harder than the parent material. Any material may be used for the wear coat so long as it is harder and more wear-resistant than parent material, and otherwise suitable for the intended operating conditions of the component. By way of example and not limitation, the wear coat 90 may be constructed from a cobalt-based alloy such as T-800 or a ceramic material.

The wear coat 90 may be positioned in the recess 82 as a preformed puck and optionally secured by conventional methods. For example, a preformed puck could be inserted into the recess 82 and retained by friction or interference fit. As another example, the recess 82 and a preformed puck could be provided with mating screw threads as a retention feature. As another example, a preformed puck could be inserted into the recess 82 and retained by bonding, such as an adhesive, diffusion bonding, brazing, or welding. Another example of a method for forming or positioning the wear coat 90 within the recess 82 include a flame spraying process such as high velocity oxy-fuel (HVOF). Another example of positioning the wear coat 90 within the recess 82 is building up layers of successive weld material. Following the positioning of the wear coat 90, the wear coat 90 can be machined such that it is generally flush with the end surface 78.

The disclosed technology can be better understood from the description of the operation thereof. The tip shrouds 70 are configured to provide support in vibration dampening characteristics to the blades 46. In this regard, during operation of the turbine engine 10, end surfaces 78 of adjacent tip shrouds 70 contact each other. Bias of adjacent blades 46 ensures that the adjacent tip shrouds 70 provide mutual support, thereby reducing vibration of the blades 46. Relative movement between contacting end surfaces 78 is not intended, but can occur. Such relative motion between adjacent blades 46 can cause damage such as fretting wear.

To prevent damage from such relative movement, the wear coat 90 of each blade is positioned such that at least some of the contact between adjacent blades 46 occurs at fretting surfaces 92. Preferably all contact occurs at fretting surfaces 92 and does not occur in other regions of the surface 78. It should be appreciated that during operation portions of the surface 78 that surround the fretting surfaces 92 can wear as a result of relative motion and contact with adjacent blades 46. Such wear can cause dimensional change sufficient to cause adjacent surfaces 78 not to contact each other. In these cases, the fretting surface 92 remains the primary contact surface.

Figure 7:
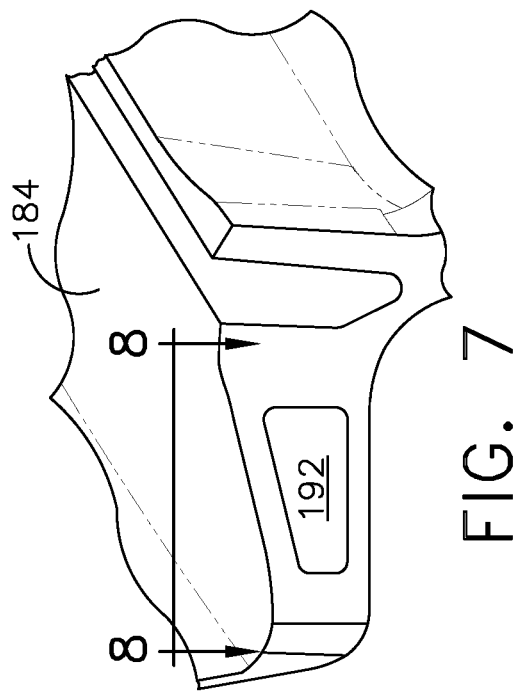
FIG. 7 shows a section of the tip shroud of the blade shown in FIG. 6.
Figure 8:
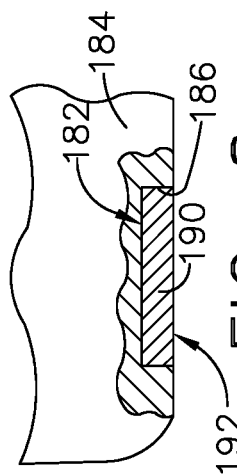
FIG. 8 shows a section of the tip shrouds shown in FIG. 7 taken along line 8-8.
Figure 6:
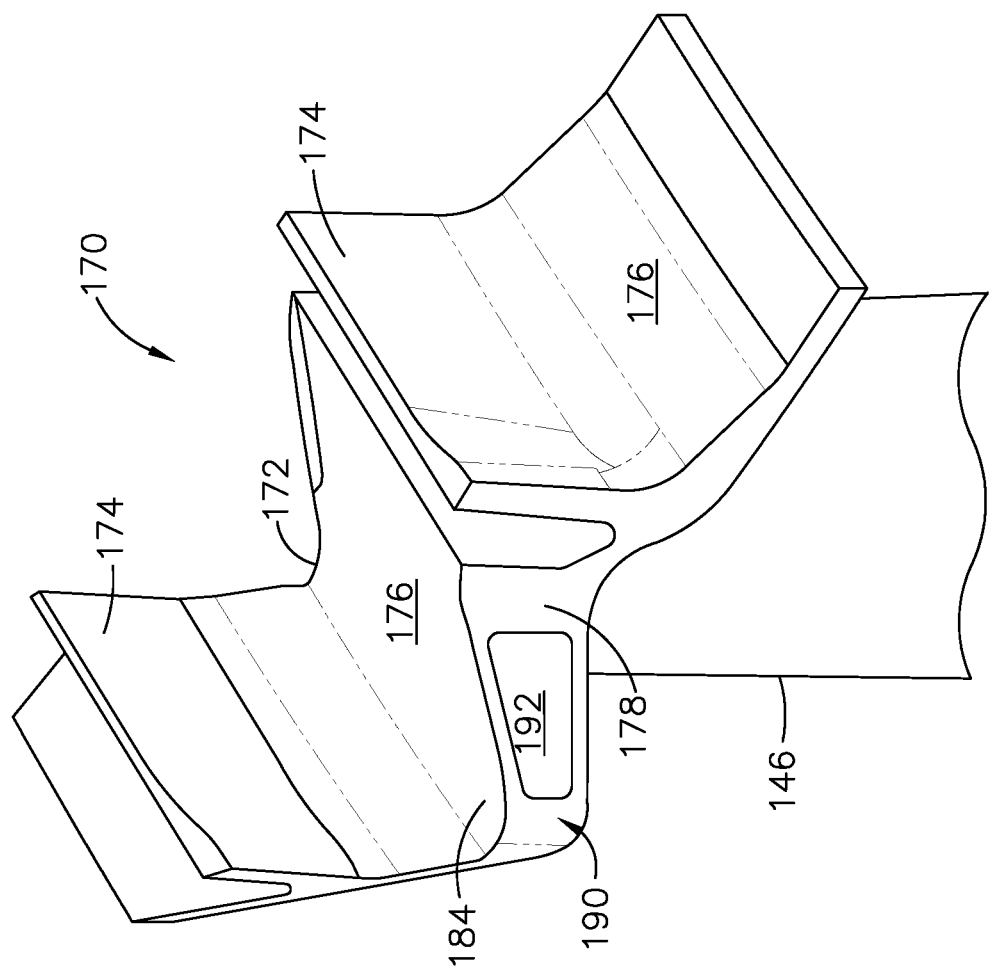
FIG. 6 is a perspective view of an end portion of a blade according to an alternative embodiment.

An alternative embodiment of the present invention that provides a blade 146 is shown in FIGS. 6, 7, and 8. It should be appreciated that in the following description of the alternative embodiment, parts associated with 100 series reference numbers can be understood from the description of similar parts in the zero series of reference numbers described above. The tip 170 of each blade 146 includes a tip shroud 172. The tip shroud 172 includes seal teeth 174 and defines a tip shroud outer surface 176 and at least one end surface 178 that is configured to contact an adjacent end surface 178 of an adjacent tip shroud 172.

The tip shroud 172 of each blade 146 includes a tip shroud body defining at least one end surface or contact surface 178. At least one recessed area 182 is defined in the end surface 178. The recessed area 182 is bounded by a wall surface 186. The wall surface 186 is dimensioned to contain wear coat 190, that is configured to provide fretting protection. The wear coat 190 defines a hardened fretting surface 192, which may be flush with the end surface 178. As shown in FIG. 6, the wear coat 190 defines a generally trapezoidal surface 192 and is positioned at one location in the end surface 178.

The turbomachinery apparatus described herein will reduce fretting between contacting components as compared to prior art devices. This will prevent damage to components and extend their useful life.

The foregoing has described a turbomachinery apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A turbomachinery component that includes a bounded wear coat, the component comprising:
    a body that is comprised of a first material;
    a tip shroud having two seal teeth;
    a contact surface defined by the body;
    a recess extending into the body and being bound by a wall surface of the body that intersects the contact surface such that the recess is open to the contact surface; and
    a wear coat having a wear coat wall and an end, the wear coat positioned in the recess such that the wear coat wall is bounded by the wall surface and the end of the wear coat defines a hardened fretting surface flush with the contact surface,
    wherein the wear coat is comprised of a second material that is different than the first material,
    wherein at least a portion of the hardened fretting surface is configured to contact an adjacent turbomachinery component,
    wherein the turbomachinery component is an airfoil, and
    wherein the contact surface is an end surface of the tip shroud between the two seal teeth.

2. The turbomachinery component according to claim 1, wherein the second material is harder than the first material.

3. The turbomachinery component according to claim 2, wherein the first material is a metal alloy.

4. The turbomachinery component according to claim 3, wherein the second material is a cobalt-based alloy.

5. The turbomachinery component according to claim 3, wherein the second material is a ceramic material.

6. The turbomachinery component according to claim 1, wherein the recess is circular.

7. The turbomachinery component according to claim 1, wherein the recess is polygonal.

8. The turbomachinery component according to claim 7, wherein the recess is trapezoidal.

9. The turbomachinery component according to claim 1, wherein the wear coat is located at multiple discrete locations in the contact surface.

10. An apparatus that includes a bounded wear coat, the apparatus comprising:
    a first body comprised of a first material that defines at least a portion of a first abutting component, the first abutting component including a first end surface;
    a first recess extending into the first end surface and bounded by a first wall surface that intersects with the first end surface;
    a first wear coat having a first wear coat wall and an end, the first wear coat comprised of a second material positioned within the first recess such that the first wear coat wall is bounded by the first wall surface and the end of the first wear coat defines a first hardened fretting surface flush with the first end surface;
    a second body comprised of the first material that defines at least a portion of a second abutting component, the second abutting component including a second end surface abutting the first end surface;
    a second recess extending into the second end surface and bounded by a second wall surface that intersects with the second end surface; and
    a second wear coat having a second wear coat wall and an end, the second wear coat comprised of the second material positioned within the second recess such that the second wear coat wall is bounded by the second wall surface and the end of the second wear coat defines a second hardened fretting surface flush with the second end surface,
    wherein the first hardened fretting surface contacts the second hardened fretting surface and the first material is different than the second material, and
    wherein the first end surface is an end surface of a first tip shroud between two seal teeth of the first tip shroud and the second end surface is an end surface of a second tip shroud between two seal teeth of the second tip shroud.

11. The apparatus according to claim 10, wherein the first material is a metal alloy.

12. The apparatus according to claim 11, wherein the second material is a cobalt-based alloy.

13. The apparatus according to claim 11, wherein the second material is a ceramic material.

14. The apparatus according to claim 10, wherein the first wear coat is located at multiple discrete locations in the first end surface and the second wear coat is located at multiple discrete locations in the second end surface.

* * * * *